Aug. 20, 1957 R. FLEETWOOD 2,803,369
PALLET CARRIER
Filed June 14, 1955 2 Sheets-Sheet 1

INVENTOR
ROSCOE FLEETWOOD
BY
Bacon & Thomas
ATTORNEYS

Aug. 20, 1957 R. FLEETWOOD 2,803,369
PALLET CARRIER
Filed June 14, 1955 2 Sheets-Sheet 2
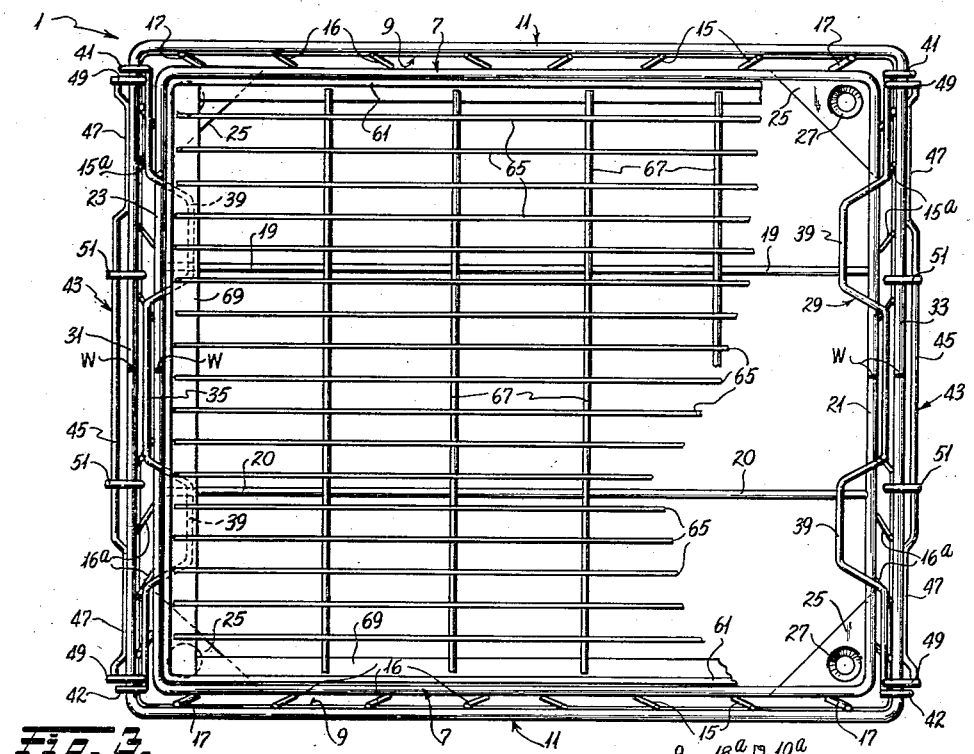
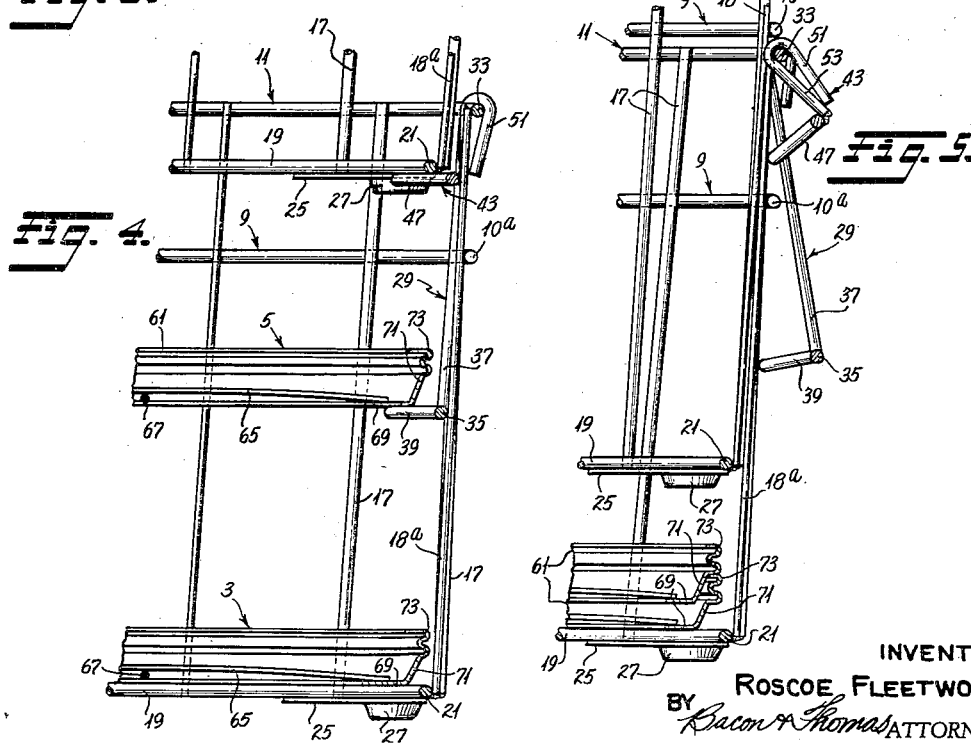
INVENTOR
ROSCOE FLEETWOOD
BY Bacon & Thomas ATTORNEYS

United States Patent Office 2,803,369
Patented Aug. 20, 1957

2,803,369

PALLET CARRIER

Roscoe Fleetwood, Thomasville, Ga., assignor to Properties, Incorporated, Thomasville, Ga., a corporation of Florida Application June 14, 1955, Serial No. 515,449

8 Claims. (Cl. 220—19)

This invention relates generally to receptacles of the type adapted to be used for transporting articles, such as wrapped bread, for example, and more particularly relates to receptacles of this class which are adapted to be selectively stacked upon one another when full and nested within one another when empty.

It is well known that many article-transporting receptacles in use today are entirely inadequate for efficient and economical handling purposes. For example, the baking industry generally employs large boxes or baskets formed of wood, metal, or fibrous sheet material to store and transport loaves of bread. In many instances, the filled receptacles are transported by large vans from the bakery to distributing stations where the bread loaves are individually removed from the receptacles and placed in racks, or on smaller delivery trucks for delivery to the retail outlets. The necessity of handling the loaves individually contributes materially to the distribution cost and often results in damage to the product. A further factor in the distribution cost arises from the expense of replacement of the receptacles as they are not usually sturdy enough to withstand the rigors of everyday usage for any substantial period of time. Moreover, in returning the boxes to the bakeries, a large amount of transportation space is required, and at the bakery itself, where storage space may be scarce, particularly when non-nesting receptacles are used.

The primary object of this invention is to provide a greatly improved receptacle of the type disclosed in Patent 2,252,964, which has greatly increased utility with respect to the handling of articles from a producer, manufacturer, or wholesaler to the retailer; which will eliminate the necessity of handling such articles individually; and will reduce handling and transportation costs of the receptacles as well as the article, with less article damage.

Another object is to provide a receptacle including a pallet carrier and a plurality of removable pallets, wherein the pallets may be readily mounted in the carrier in vertically spaced relation and may be quickly and easily removed therefrom.

A further object is to provide a receptacle including a carrier and a plurality of removable pallets, wherein the carrier is provided with means for supporting one or more pallets in vertically spaced relation relative to a removable bottom pallet and wherein such means are retractable when not in use to permit a plurality of empty carriers to be nested.

A still further object is to provide a pallet carrier which can be selectively stacked with similar carriers when filled, or nested with similar carriers when empty, and wherein means are provided for selectively supporting one or more removable pallets intermediate the top and bottom thereof, and/or wherein the pallets can also be nested.

A more specific object is to provide a receptacle construction particularly useful in bakeries for the mass handling of loaves of wrapped bread as they are delivered from a wrapping machine for distribution to retail outlets.

Another object is to provide a receptacle which can be readily adapted to serve a variety of uses and to handle a large number of different articles.

Another object is to provide a receptacle of such rigid construction and sturdy material as to minimize the expenses of depreciation, repair, and replacement.

Another object is to provide a receptacle which is attractive in design, light in weight, and economical to manufacture.

Other objects and advantages will be apparent from the following description taken in conjunction with the accompanying drawings, in which:

Fig. 3 is a plan view of one of the receptacles shown in Fig. 1, with only the upper pallet in position, said upper pallet having certain parts thereof broken away to facilitate illustration of underlying portions of the receptacle;

Fig. 4 is an enlarged fragmentary cross-sectional view taken on the line 4—4 of Fig. 2; and Fig. 5 is an enlarged cross-sectional view similar to Fig. 4, but showing the receptacles and pallets in nested relation.

Figure 1:
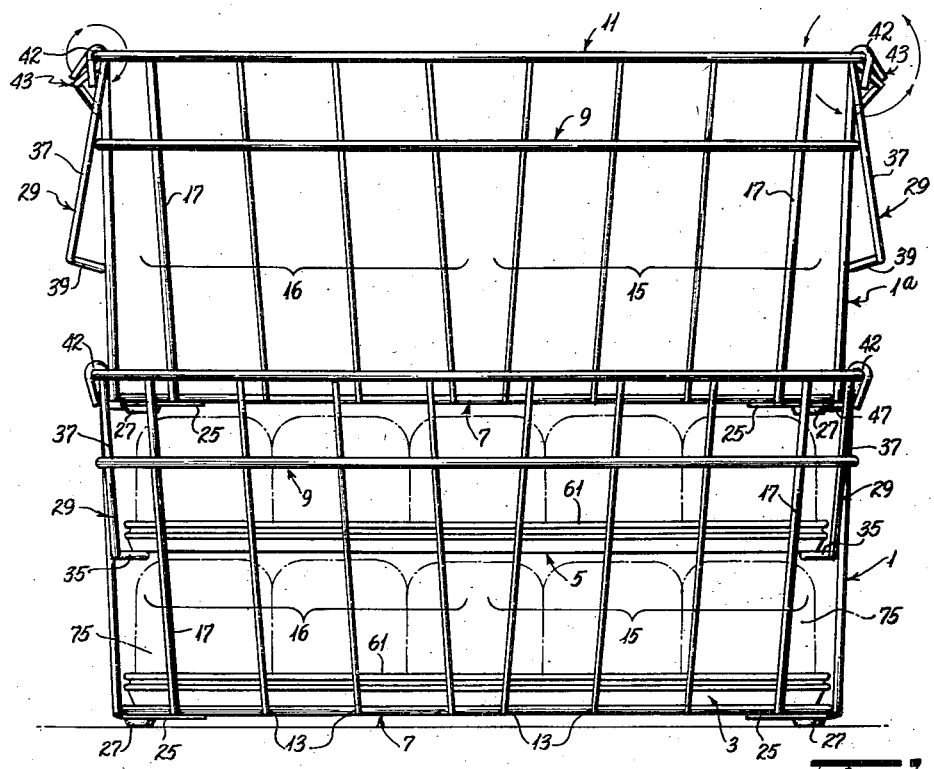
Fig. 1 is a front elevational view showing two receptacles embodying the present invention, said receptacles being shown in stacked relation, the pallets of the lower receptacle containing articles shown in dot-and-dash lines to illustrate a loaded condition, and the upper receptacle being shown with its pallets removed preparatory to being loaded.
Figure 2:
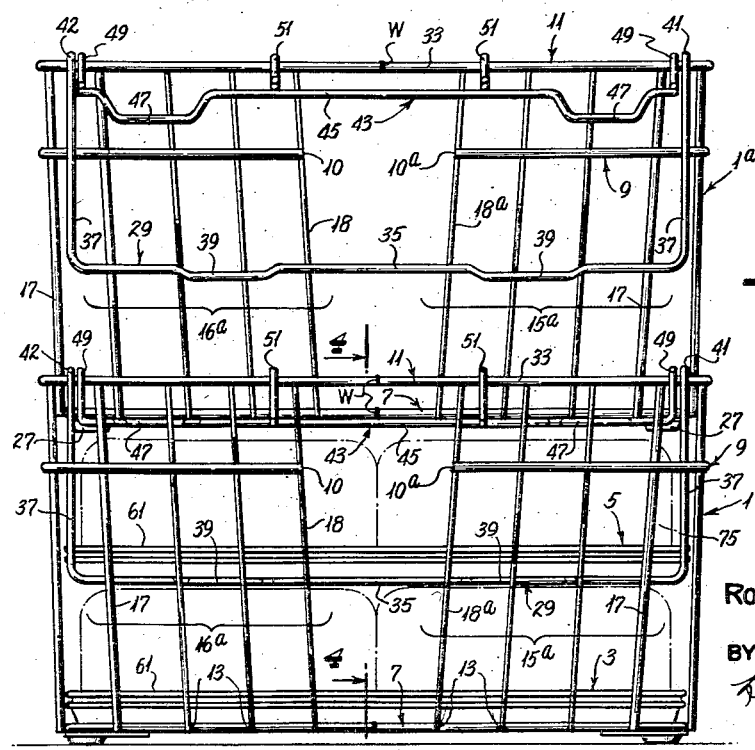
Fig. 2 is a side elevational view of the stacked receptacles shown in Fig. 1.

Referring now to the drawings in detail, the receptacle assembly, as illustrated by the lowermost of the stacked receptacles shown in Figs. 1 and 2, comprises a pallet carrier generally indicated by the numeral 1, carrying a lower tray or pallet 3 at the bottom thereof, and an upper tray or pallet 5 in spaced relation from the bottom pallet 3. The carrier 1 may be made of any size, for example, about 22″ wide, 25″ long and 12″ deep, and comprises a bottom frame 7, an intermediate frame 9, and an upper frame 11. The bottom frame 7 and the upper frame 11 are each formed of a single, rigid, hot rolled steel rod or wire of about 5/16″ dia., bent to rectangular configuration and joined at the ends as by welding w. The intermediate frame 9 is in two sections (5/16″ dia.) terminating in spaced ends 10 and 10a, i. e., frame 9 is of generally rectangular configuration but with an intermediate portion of a pair of opposing ends removed. This construction facilitates moving of the pallets 3 and 5 in and out of the carrier, as will become apparent as the description proceeds. From spaced points 13 along each outer edge of the bottom frame 7, two oppositely inclined groups of parallel wires (3/16″ dia.) extend upwardly to form side and end walls for the carrier 1, the groups of wires forming the sides of the carrier being designated by the numerals 15 and 16, and the groups of wires forming the ends of the carrier being designated by the numerals 15a and 16a. The end wires 17 of these groups of wires, i. e., the wires adjacent the corners of the frames 7, 9 and 11 are of relatively heavy gauge, for example, of the same gauge (5/16″ dia.) as that of the wires for the frame members 7, 9, and 11, whereas the intermediate wires may be of a lighter gauge (3/16″ dia.). The two groups of wires 15—16 and 15a—16a are situated on opposite sides of the center of the respective sides and ends of frame 7, and are arranged to diverge upwardly toward the top frame member 11. This provides a very rigid and braced construction, and facilitates nesting of the carriers. It will be noted that the inner wires 18 and 18a, of the groups of oppositely-inclined wires 15a and 16a forming the ends of the carrier, are relatively widely spaced, preferably at least by a hand's breadth (4 to 5 inches), and are joined to the intermediate frame 9 at its ends 10 and 10a. Thus, a clear or unobstructed space extending all the way from top frame 11 to bottom frame 7 is provided. Wires 15—16 and 15a—16a extend upwardly from the outer edge of bottom frame 7, pass in contact with the inner edge of intermediate frame 9, and terminate in contact with the inner edge of the top frame 11, said wires being secured to the respective frames at these points by welding or other suitable means. To effect the construction illustrated and to permit nesting of the carriers, it is necessary that the internal dimensions of frames 9 and 11 exceed the external dimensions of bottom frame 7 by a distance at least equaling the diameter of the largest side and end wires, i. e., the upright wires 17.

In the embodiment illustrated in the drawings, the side and end walls formed by the groups of wires 15—16 and 15a—16a are slightly tapered inwardly from top to bottom, but it will be understood that the sides and ends may have a greater or lesser degree of taper if desired, or may be substantially vertical. When tapered sides are employed, it is preferred that the degree of taper be relatively slight in order to conserve space when the carriers are stacked side by side and so that pallets of predetermined standard size may fit both at the bottom and intermediate portions of the carrier.

As shown in Fig. 3, spaced longitudinal struts 19 and 20 are positioned between end portions 21 and 23 of the frame 7 in abutting relation thereto, and are secured in this position by welding at their ends, or by any other suitable means, to form a sturdy bottom support for the carrier 1 on which the lower pallet 3 may rest. Triangular gusset plate members 25, $\frac{1}{16}$" thick, having depressed pads or foot portions 27 formed therein, are welded across the corners of the bottom frame 7 at the lower side thereof and serve to raise the body of the carrier off the floor and facilitate sliding it thereover, as well as to provide additional bracing for the frame member 7.

According to one of the features of the invention, two pallet-support members, generally indicated by the numeral 29, are suspended from opposing end portions 31 and 33 of the upper frame member 11, and are adapted in one position thereof, as shown by the bottom carrier 1 in Figs. 1, 2 and 4, to support the upper pallet 5. The pallet-supporting members 29 are formed of a wire or rod ($\frac{5}{16}$" dia.) of rigid material bent to form a horizontal portion 35 between a pair of substantially vertical suspending arms 37. The horizontal portions 35 are provided with two generally U-shaped bends 39 (Fig. 3) which extend inwardly toward the center of the receptacle when the support member 29 is in the aforesaid position within the carrier 1, thereby providing ledges for receiving and supporting the bottom of upper pallet 5. The suspending arms 37 are bent at their terminal ends to form loops 41 and 42 which loosely encircle the respective end portions 31 and 33 of the upper frame member 11 near the corners thereof, and permit the pivoting or swinging of the pallet-support 29 from its outer position exteriorly of the carrier, as shown in the top carrier 1a in Figs. 1 and 2, to its inner pallet-supporting position within the carrier, as shown in the bottom carrier of these figures. The suspending arms 37 are of such length as to position the horizontal portion 35 along the inside of the end walls of the carrier at a height approximately midway between the top and bottom thereof. While only one pair of pallet supports 29 is shown, it will be understood that additional supports, or extensions of the same support, could be provided, if desired, to enable a plurality of pallets to be supported within the carrier at different levels in spaced relation from the bottom struts thereof.

The end portions 31 and 33 of the carrier 1 are also provided with a pair of combined handles and stacking members 43, which are selectively swingable to a position within the top portion of the carrier 1 to permit stacking of the carriers, as shown in Figs. 1 and 2, or to a position outside of the carrier for use as handles or to permit the nesting of the carriers as shown in Fig. 5. Stacking members 43 are constructed of rod material ($\frac{5}{16}$" dia.) bent to form horizontal support portions 45 having two inwardly extending U-shaped bends 47 adapted to form a ledge to receive the bottom portion of a superimposed carrier, with the bottom frame 7 nesting therein. Stacking members 43 are provided with supporting loops 49 at each end which loosely encircle the end portions 31 and 33, respectively, of top frame 11 at points which lie slightly inwardly of the loops 41 and 42 of the pallet-support 29. In addition, a pair of intermediate loops 51 is secured to each of the horizontal support portions 45, and extend upwardly therefrom to loosely encircle the end portions 31 and 33 of top frame 11 at substantially equally spaced points between the loops 49. It will be seen that the stacking members 43 may conveniently serve as handles when a loaded or unloaded carrier is being lifted or carried by hand. The length of the shank portions 53 of loops 49 and 51 preferably is just sufficient to permit the superimposed carrier, as carrier 1a in Figs. 1 and 2, to fit inside the top portion of an underlying or bottom carrier to an extent that will ensure against slipping or tipping of the top carrier or carriers when stacked carriers are being transported. The bottom frame 7 of the top carrier preferably fits snugly against the shank portions 53 of the two pairs of loops 49 and 51 on each end of the lower carrier, thereby substantially preventing relative movement between the stacked carriers. The four supporting loops on each end of the stacking members 43 also ensure against wobbling of the stacked carriers.

When the carrier is fabricated of iron or steel, it is desirable that all its members be galvanized and it has been found convenient to effect this by galvanizing the entire carrier as a unit. It will be understood, however, that the carrier may be constructed of aluminum, magnesium alloy, or other relatively non-corrosive material, in which instance no protective coating need be employed.

It will also be understood that the wire or rod diameters set out hereinbefore are illustrative and any suitable diameter may be used in carrying out the principles of the invention.

The pallets 3 and 5 are preferably identical in construction, and each comprises a frame 61, preferably of sheet aluminum or other light metallic material, and a grid consisting of non-corrosive transverse wires 65 and longitudinal wires 67. The frame 61 consists of an inwardly extending lateral flange 69 upon which the ends of the wires 65 and 67 rest and are attached by welding or the like, an upwardly inclined portion 71 extending outwardly from the outer edges of flange 69, and a double-headed outer top portion 73 extending upwardly from the top edges of said inclined portion 71 to form a retaining rim around the upper edge of the pallet. The pallets 3 and 5 are of such lateral dimensions as to be conveniently accommodated in the carrier 1, and the construction is such that two or more of said pallets will nest in each other (as shown in Fig. 5) with their top portions 73 resting upon one another and their inclined portions 71, flanges 69, and grids being thereupon conveniently accommodated in telescoping relation with respect to one another.

It will be understood that trays or pallets of differing types of construction may be employed with the pallet carrier described herein. For example, they can be formed of flat sheet material of solid or perforated construction, with or without reinforcing side members.

When the pallets 3 and 5 are removed from the carrier 1 and the pallet-support members 29 have been pivoted to the outside of the carrier, the receptacle is in a condition to be loaded, as illustrated by the upper carrier 1a in Figs. 1 and 2. The pallets 3 and 5 are preferably loaded independently of the carrier, either automatically or by hand, with articles to be carried, as, for example, with a number of loaves of bread, ten for example, as shown in the dot-and-dash lines at 75. The lower pallet may then be placed in position in the bottom of the carrier and the pallet-support members 29 pivoted into position inside the carrier to receive a loaded upper pallet 5 thereon; whereupon, the stacking members 43 are then pivoted into position inside the loaded carrier; whereupon such carrier may receive a second receptacle 1a stacked thereon, as illustrated in Figs. 1 and 2. The wide spacing between the inner wires 18 and 18a of the ends of the carrier and between the ends 10 and 10a of the intermediate frame 9 permit insertion of the hands of the loader or delivery man into the body of the carrier and thereby facilitates the handling of the pallets into and out of the carrier.

The receptacle of the present invention has been found to be especially advantageous in solving the handling and transportation problems in the baking industry. In a typical operation heretofore employed, bread is packed by hand in large wooden boxes which are then stacked in large vans for distribution from the bakery to substations. At the substations the bread is removed by hand and placed in racks in smaller delivery trucks for transportation to retail outlets. This method is unsatisfactory as it is necessary to handle each individual loaf of bread in moving it from the wooden boxes to the racks of the delivery trucks, and again from the racks to another box to carry the bread into the retail outlet. There is the additional problem of transporting the empty boxes back to the bakery and storing them when not in use. Since the boxes will not nest, a large amount of transportation and storage space is required. In addition, the wooden boxes are costly and have a short useful life.

In utilizing the receptacles of the present invention, the pallets may be employed independently of the carrier to receive a predetermined number of loaves of bread as these loaves are delivered from a wrapping machine. These loaves thereafter may be handled as a unit. Ten loaves, as illustrated in position on pallets of the lower carrier of Figs. 1 and 2, have been found to be a convenient number. The loaded pallets are then placed in the carriers in the manner previously described and the carriers may be stacked in the vans for delivery to the substations. The stacking means of the receptacles insure against sliding and tipping of the stacked carriers and so avoid damage due to spillage. At the substation the bread may be transferred in the receptacles, or on the pallets, to the delivery trucks. The delivery man may take the pallets from the carriers and place them on racks installed in his truck, and after loading may drive to the retail stores and utilize the same pallets in carrying the bread from the delivery truck into the stores. The emptied carriers may be stacked in the van independently of the pallets for return to the bakery, or both the carriers and the pallets may be returned together.

In some operations it may be desired to place the loaves of bread directly on shuffle trays in the delivery trucks. In this instance the loaves may be transferred to the delivery truck on the pallets and slid off as a body into position on the shuffle tray. For this purpose a smooth pallet may be used or the pallets described herein may be employed in inverted position. As the carriers and pallets are emptied, they may be nested within one another as shown in Fig. 5, the pallets being nested at the bottoms of the nested carriers.

In either of the operations described, it is not necessary to touch or handle the individual loaves of bread from the time they leave the wrapping machine until they reach the retail outlet. The product, therefore, is much less likely to be damaged than in the procedures heretofore employed, and the entire handling operation is greatly facilitated. At least two-thirds of the space normally needed for return transportation and storage of the carriers is saved.

It will thus be readily seen that the invention described herein is well suited to use in a variety of transportation operations and fully achieves the stated objectives. It should be understood that the invention is not limited to any specific use and that a number of changes and modifications may be made in the details of construction, design, and dimensions of the carrier unit without departing from the principles of the invention or the scope of the appended claims.

I claim:

1. A receptacle, comprising: a lower pallet; an upper pallet; and a generally rectangular pallet carrier having outer walls, bottom means supporting said lower pallet, members supporting said upper pallet at a point approximately midway of the height of said receptacle above said lower pallet, said members being pivotally mounted on said carrier and arranged to be pivoted between positions inside and outside of said carrier, and pivotally mounted means on said carrier independent of said first-mentioned pivotally mounted members for supporting a similar carrier above said upper pallet.

2. A receptacle, comprising: a lower pallet; an upper pallet; and a generally rectangular pallet carrier having four walls, a generally rectangular frame member defining the uppermost extremities of said walls, bottom means supporting said lower pallet, members suspended from said frame member and having ledge means at the lower ends thereof in a position adjacent the inner side of opposite walls of said carrier approximately midway of the height of said walls for supporting said upper pallet above said lower pallet, said members being pivotable on said frame member from said position inside said walls to a position outside of said walls, and additional members pivotable on said frame member and having ledge means in a position adjacent the upper end of said pallet carrier for supporting a second carrier above said upper pallet.

3. A generally rectangular receptacle having outer walls, a frame member defining the uppermost extremities of said walls, at least one pair of support members suspended along the inside of opposite walls of said receptacle, said support members including inward projections located about midway of the height of said walls for supporting a pallet and also including arms extending upwardly and terminating in loops which loosely encircle said frame member, whereby said support members may be removed from within said receptacle by being pivoted on said frame member, and a second pair of support members suspended along the inside of opposite walls of said receptacle, said last-mentioned support members including inward projections located adjacent the upper extremities of said receptacle for supporting a second receptacle thereabove, said last-mentioned support members including arms extending upwardly and terminating in loops which are positioned between said first-mentioned loops and loosely encircle said frame member, whereby said second pair of support members may also be removed from within said receptacle by being pivoted on said frame member.

4. A nestable pallet carrier, comprising: a bottom frame member of generally rectangular configuration; a top frame member of the same general configuration as said bottom frame member but of slightly larger dimensions; two groups of oppositely-inclined parallel upright wires extending between each of the corresponding ends and sides of said frame members and forming end and side walls, the inner wires of a pair of oppositely-disposed walls being spaced apart a substantially greater distance than the remaining wires of said walls to provide openings large enough to facilitate manual removal of pallets from said carrier; a pair of pallet support members pivotally suspended from the top frame member along a pair of said oppositely-disposed walls, said support members having horizontal portions for supporting a removable pallet within said carrier; and a pair of stacking members pivotally supported on said top frame member within said pallet supporting members, said pallet supporting members and stacking members being selectively swingable to a position on the outside of said carrier to permit said carrier to nestingly receive a carrier of similar construction.

5. A pallet carrier, comprising: a bottom frame member, an intermediate frame member, and a top frame member, said members being of generally rectangular configuration, the intermediate and top frame members being of greater internal dimensions than the external dimension of said bottom frame member; two groups of generally parallel oppositely-inclined upright wires joining said bottom, intermediate, and top frame members along each end and side of said members, said upright wires being secured to the outer edge of said bottom frame member and to the inner edges of said intermediate and top frame members to thereby provide end and side walls of nestable construction; means for supporting a pallet at the bottom of said carrier; a pair of pallet-support members pivotally suspended from opposite ends of said top frame member and having horizontally-extending portions for supporting a pallet in spaced relation to said bottom pallet, said pallet-supporting members being selectively swingable to a position outside of said carrier when not in use; and a pair of stacking members also pivotally supported about opposite ends of said top frame member and selectively swingable to a position inside of said carrier for stacking an additional carrier thereon and to a position outside of said carrier to nestingly receive a similar carrier, said intermediate frame having a portion thereof removed at the mid-point of said end walls and the innermost upright wires of said end walls being relatively widely spaced to permit insertion of the hands for manipulation of said pallets in said carrier and for removing said pallets from said carrier.

6. A receptacle comprising: a carrier having generally rectangular top and bottom frame members; a plurality of oppositely-inclined parallel groups of upright wires providing end and side walls between said top and bottom frame members; longitudinally extending members interconnecting the opposite ends of said bottom frame member and adapted to serve as a support for a pallet; and generally triangular reinforcing plates mounted at each corner of said bottom frame member, each of said reinforcing plates having a depressed portion extending below the bottom frame member and adapted to serve as a floor engaging means.

7. A receptacle, comprising: a carrier having generally rectangular, circumferentially continuous top and bottom frame members, a plurality of oppositely inclined parallel groups of upright wires extending between said top and bottom frame members and providing end and side walls for said receptacle, the innermost wires of said oppositely inclined groups of upright wires forming said end walls being spaced apart throughout their height a substantially greater distance than the spacing between the remaining wires of said groups of wires of said end walls to provide openings extending for the full height of said end walls to facilitate the removal of pallets from said carrier; at least one pair of pallet support members pivotally suspended from said top frame member along a pair of opposing walls of said carrier, said support members including ledge-forming portions which assume an operative position about midway of the height of the walls of the carrier for supporting a pallet and suspending arms extending upwardly from said ledge-forming portions and terminating in loops which loosely encircle said top frame member on opposite sides of said openings, whereby said support members may be selectively swung in and out of said carrier by being pivoted about said top frame member.

8. A receptacle as defined in claim 7 including an intermediate frame member extending around the carrier and comprising sections connected to the exterior of the walls of the carrier between the top and bottom frame members, said sections having end portions terminating at said openings.

References Cited in the file of this patent

UNITED STATES PATENTS

| | | |
|---|---|---|
| 921,694 | Hall | May 18, 1909 |
| 1,156,690 | Jones | Oct. 12, 1915 |
| 1,814,784 | Bennett | July 14, 1931 |
| 1,890,983 | Griffith | Dec. 13, 1932 |
| 2,252,964 | Faulkner | Aug. 19, 1941 |
| 2,301,032 | Fielding | Nov. 3, 1942 |
| 2,364,705 | Geralds | Dec. 12, 1944 |
| 2,438,030 | Bitney | Mar. 16, 1948 |
| 2,513,452 | Coit | July 4, 1950 |
| 2,537,725 | Watson | Jan. 9, 1951 |
| 2,541,972 | Wallace | Feb. 13, 1951 |
| 2,581,613 | Ullrich | Jan. 8, 1952 |
| 2,609,120 | Williams | Sept. 2, 1952 |
| 2,655,283 | Moldt | Oct. 13, 1953 |

FOREIGN PATENTS

| | | |
|---|---|---|
| 1,052,978 | France | Sept. 30, 1953 |
| 1,088,347 | France | Sept. 8, 1954 |